(12) United States Patent
Patterson et al.

(10) Patent No.: US 6,804,752 B2
(45) Date of Patent: Oct. 12, 2004

(54) EVENT DATA PROTECTION METHOD FOR A FLASH PROGRAMMABLE MICROPROCESSOR-BASED CONTROL MODULE

(75) Inventors: James Frank Patterson, Greentown, IN (US); Edward J Wallner, Kokomo, IN (US)

(73) Assignee: Delphi Technologies, Inc., Troy, MI (US)

(*) Notice: Subject to any disclaimer, the term of this patent is extended or adjusted under 35 U.S.C. 154(b) by 621 days.

(21) Appl. No.: 09/823,005

(22) Filed: Apr. 2, 2001

(65) Prior Publication Data

US 2002/0143409 A1 Oct. 3, 2002

(51) Int. Cl.$^7$ ................................................. G06F 12/14
(52) U.S. Cl. ...................... 711/163; 711/103; 711/115; 711/163; 711/164; 711/151; 711/154; 235/50 R; 235/50 A; 235/50 B; 235/382; 365/195; 365/228; 365/233.5; 713/193; 714/773; 714/814; 714/815; 714/819
(58) Field of Search ................................. 711/103, 115, 711/163, 164, 151, 154; 235/50 R, 50 A, 50 B, 382; 365/195, 228, 233.5; 713/193; 714/773, 814–815, 819

(56) References Cited

U.S. PATENT DOCUMENTS 4,644,494 A * 2/1987 Muller ........................ 711/152
4,646,241 A * 2/1987 Ratchford et al. ............. 701/14
4,729,102 A * 3/1988 Miller et al. .................. 701/14
6,026,293 A * 2/2000 Osborn ........................ 455/411
6,151,657 A * 11/2000 Sun et al. .................... 711/103
6,250,548 B1 * 6/2001 McClure et al. .............. 235/51

OTHER PUBLICATIONS

Bogle, J.D, Oct. 5, 1992, IEEE Digital Avionics Conference, 1992 Proceeding, IEEE Xplore, IEEE/AIAA 11$^{th}$, pp. 2–5–209.*

* cited by examiner

Primary Examiner—Donald Sparks
Assistant Examiner—Hashem Farrokh
(74) Attorney, Agent, or Firm—Stefan V. Chmielewski (57) ABSTRACT

A flash programmable microprocessor-based control module is operated in a manner to protect the integrity of event data stored in the programmable memory of the module while permitting authorized manufacturing and field alteration of the programmable memory with a Download and Execute routine. The Download and Execute routine is resident in a designated sector of the module's read-only memory, and download access to the module's random access memory after module manufacture has been completed is denied. During manufacture of the module, and during field programming of the controller prior to the writing of event data, the programmable memory may be externally altered by an authorized service tool by transferring the Download and Execute routine from read-only memory to random access memory for execution by the module's microprocessor, and downloading the new data or code over a data link coupling the service tool to the module. After event data has been written to the programmable memory, external requests to alter the programmable or read-only memories are denied, and the transfer of the Download and Execute routine to random access memory is not permitted.

6 Claims, 6 Drawing Sheets

EVENT DATA PROTECTION METHOD FOR A FLASH PROGRAMMABLE MICROPROCESSOR-BASED CONTROL MODULE

TECHNICAL FIELD

This invention relates to a programmable microprocessor-based electronic control module designed to store data pertaining to a detected event, and more particularly to a method of protecting the integrity of the stored event data.

BACKGROUND OF THE INVENTION

In an electronic control system, it is frequently desirable to record data corresponding to various system parameters when a specified event or failure is detected. In a motor vehicle, for example, it is desirable for analytical purposes to record data such as vehicle speed, acceleration, yaw, anti-lock brake activation, engine throttle position, and so forth, at the time of a detected or impending crash event. Aircraft flight recorders perform a similar function by continuously recording data, and permanently storing only the most recently recorded data.

A requirement with data recording systems of the type described above is that the stored data must remain intact, without possibility of external modification subsequent to the detected event. This presents a problem from a practical standpoint, since other data (such as executable software routines) stored in a programmable memory (EEPROM or Flash-ROM) of the controller must be downloaded during manufacture of the module, and may need to be modified from time to time in the field in order to modify the functionality of the controller. This is ordinarily achieved by coupling an electronic service tool to the controller, and transferring a software routine, generally referred to as a Download and Execute routine, into a specified sector of random access memory (RAM) for execution by the controller's microprocessor. When executed, the Download and Execute routine allows the controller to download data from the service tool, and to write such data into specified sectors of the controller's programmable memory. Unfortunately, this same procedure could possibly be used by a careless or unscrupulous individual to alter event data, frustrating later analysis of the event. Accordingly, what is needed is a method of safeguarding event data after the module is placed into service, while permitting authorized manufacturing and field programming of the module.

SUMMARY OF THE INVENTION

The present invention is directed to an improved method of protecting the integrity of event data stored in the programmable memory of a microprocessor-based control module while permitting authorized manufacturing and field alteration of the programmable memory with a Download and Execute routine. According to the invention, the Download and Execute routine is resident in a designated sector of the module's read-only memory, and download access to the module's random access memory after module manufacture has been completed is denied. During manufacture of the module, and during field programming of the controller prior to the writing of event data, the programmable memory may be externally altered by an authorized service tool by transferring the Download and Execute routine from read-only memory to random access memory for execution by the module's microprocessor, and downloading the new data or code over a data link coupling the service tool to the module. After event data has been written to the programmable memory, external requests to alter the programmable or read-only memories are denied, and the transfer of the Download and Execute routine to random access memory is not permitted. In the illustrated embodiment, the Download and Execute routine is stored along with other executable routines in a Flash Programmable Memory (FPM), while the event data is stored in an Electrically Erasable and Programmable Read-Only Memory (EEPROM).

BRIEF DESCRIPTION OF THE DRAWINGS

The above and other advantages of the invention will become more apparent from the following description taken in conjunction with the accompanying drawings wherein like references refer to like parts and wherein:

FIGS. 3–9 are flow diagrams representative of a software routine executed by the control module of FIG. 1 according to this invention.

DESCRIPTION OF THE PREFERRED EMBODIMENT

Figure 1:
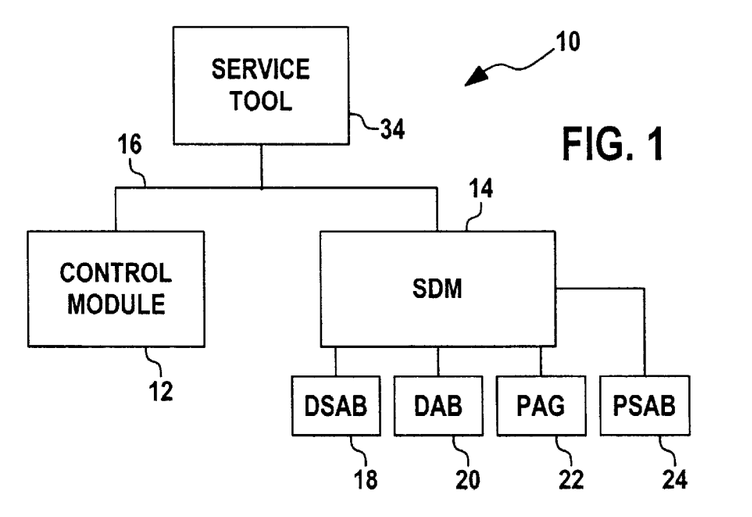
FIG. 1 is a block diagram of a motor vehicle occupant restraint sensing system, including a microprocessor-based control module according to this invention and a microprocessor-based service tool for factory or field programming the control module.

Referring to FIG. 1, data protection method of this invention is described in the context of a motor vehicle occupant restraint system 10, including a pair of microprocessor-based control modules 12 and 14 coupled to a serial data bus 16, and a number of inflatable restraint devices 18, 20, 22, 24 coupled to the control module 14. For purposes of illustration, the restraint devices 18, 20, 22 and 24 respectively represent a driver side air bag, a driver frontal air bag, a passenger frontal air bag, and a passenger side air bag. Typically, the serial data bus 16 is also coupled to other control modules such as an engine control module to enable vehicle-wide sharing of measured and computed parameters of interest. The control module 14 is designated as a Sensing and Diagnostic Module (SDM), and includes integral or remote acceleration sensors for detecting a vehicle crash event, and initiating deployment of one or more of the restraint devices 18, 20, 22, 24 if the detected crash event is deemed to be sufficiently severe. The control module 12 also detects parameters of interest to the deployment of the restraints 18, 20, 22, 24 and communicates corresponding information to SDM 14 via serial data bus 16.

For example, if the control module 12 informs SDM 14 of a detected or impending vehicle rollover event, the SDM 14 can initiate deployment of the side air bags 18 and 24. Alternatively, for example, if the control module 12 informs SDM 14 that the passenger seat is occupied by a rearward-facing infant seat, the SDM 14 can disable deployment of the passenger air bags 22 and 24.

Figure 2:
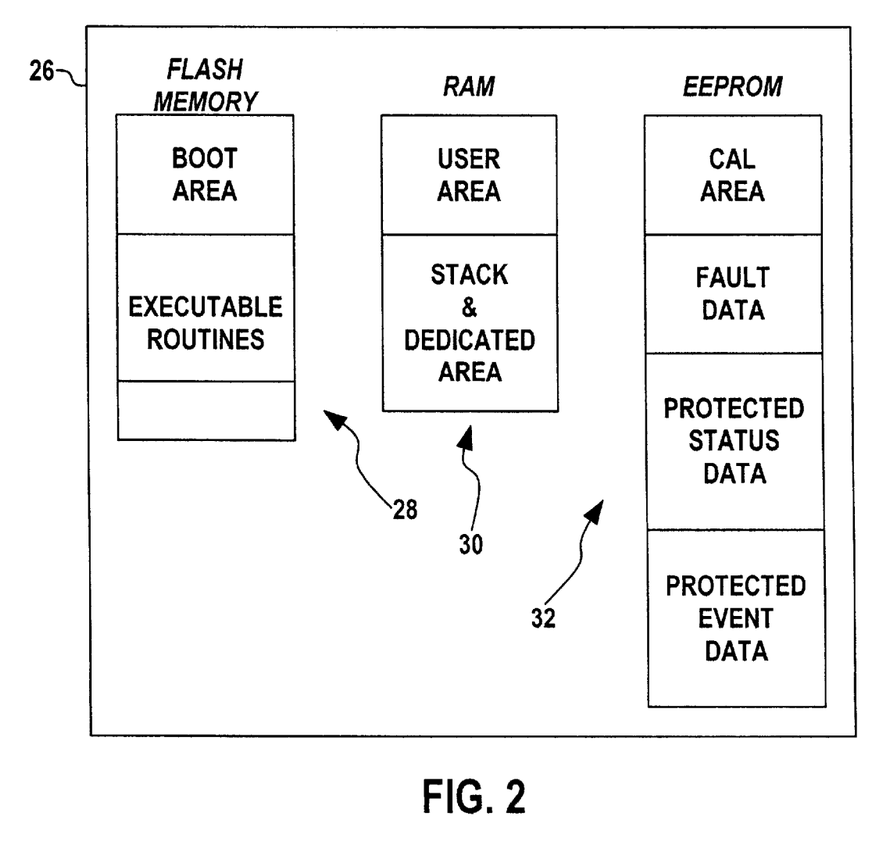
FIG. 2 is a diagram of a memory configuration of the control module of FIG. 1.

More pertinent to the present invention, the control module 12 includes a memory 26, illustrated by the memory-map of FIG. 2, for storing both executable software routines and various kinds of data. In particular, the memory 26 includes three types of memory: non-volatile flash programmable memory (FPM) 28, random access memory (RAM) 30, and non-volatile electrically erasable and programmable memory (EEPROM) 32. The FPM 28 is primarily used for non-volatile storage of executable software routines; it is programmed at the time of manufacture but has the capability of being reprogrammed with a service tool 34 via the serial data bus 16, as shown in FIG. 1 and explained below. The FPM 28 also includes a Boot area containing a failsafe routine that permits re-programming of the remaining portion of the flash memory in the event of a failed programming attempt due to loss of power, for example. The RAM 30 has a User Area for temporary storage of system variables and executable routines, and a Stack and Dedicated Area for use by an executable routine and for temporary storage of control variables utilized in transferring executable routines from FPM 28 to RAM 30. The EEPROM 32 is used for non-volatile storage of calibration data, fault data, Protected Status Data and Protected Event Data. The Status Data and Event Data are both protected from external modification once the manufacture of the module has been completed. The Status Data may include a Manufacturing Complete flag, an Ignition Cycle Counter, and so forth, whereas the Event Data includes various system and vehicle parameters (such as vehicle speed, acceleration, yaw, anti-lock brake activation, engine throttle position, etc.) in effect when control modules 12 or 14 detect a crash event.

As indicated above, factory or field programming the memory 26 involves coupling a microprocessor-based service tool 34 to the serial data bus 16 as shown in FIG. 1. For convenience, the service tool 26 may be a laptop personal computer, equipped with a level-shifting circuit for interfacing the standard RS232 data bus with the serial data bus 16 of restraint system 10.

Figure 3:
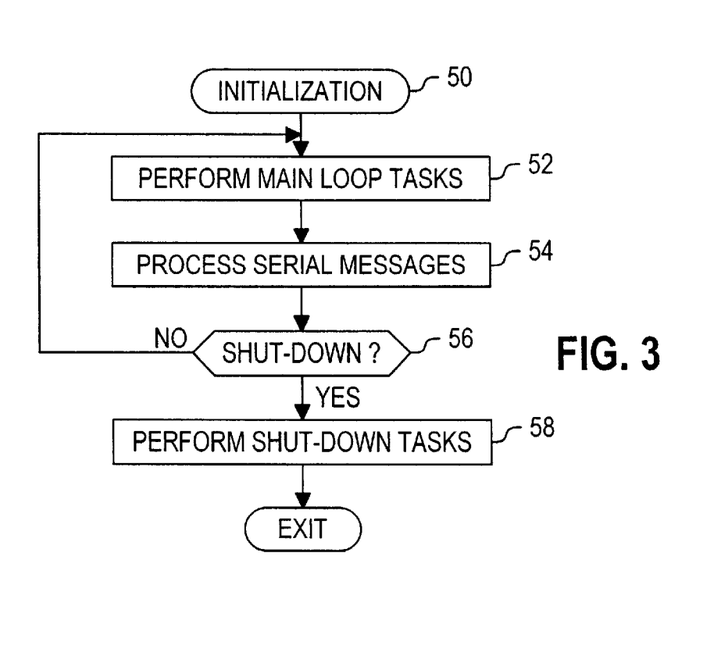
FIG. 3 illustrates a main flow diagram.

The flow diagrams of FIGS. 3–9 generally illustrate a software routine executed by the control module 12 according to this invention. FIG. 3 illustrates a main flow diagram, and FIGS. 4–9 detail a portion of the flow diagram of FIG. 3 concerning the processing of messages received from service tool 34.

Referring to the main flow diagram of FIG. 3, the block 50 designates a series of initialization instructions executed at the initiation of each period of vehicle operation for setting various parameters, flags and variables to a predetermined value. Following initialization, the blocks 52 and 54 are repeatedly executed until block 56 detects a system power-down, whereupon block 58 is executed to perform various shutdown tasks, such as writing certain parameter values to EEPROM 32. The block 52 designates various main loop functions, such as analyzing sensor information to detect vehicle rollover or passenger position, transmitting messages to SDM 14, receiving messages from SDM 14, and storing event data in EEPROM 32 if SDM 14 signals the detection of a crash event. The block 54 pertains to the processing of messages received from service tool 34, and is expanded in the flow diagram of FIG. 4.

Figure 4:
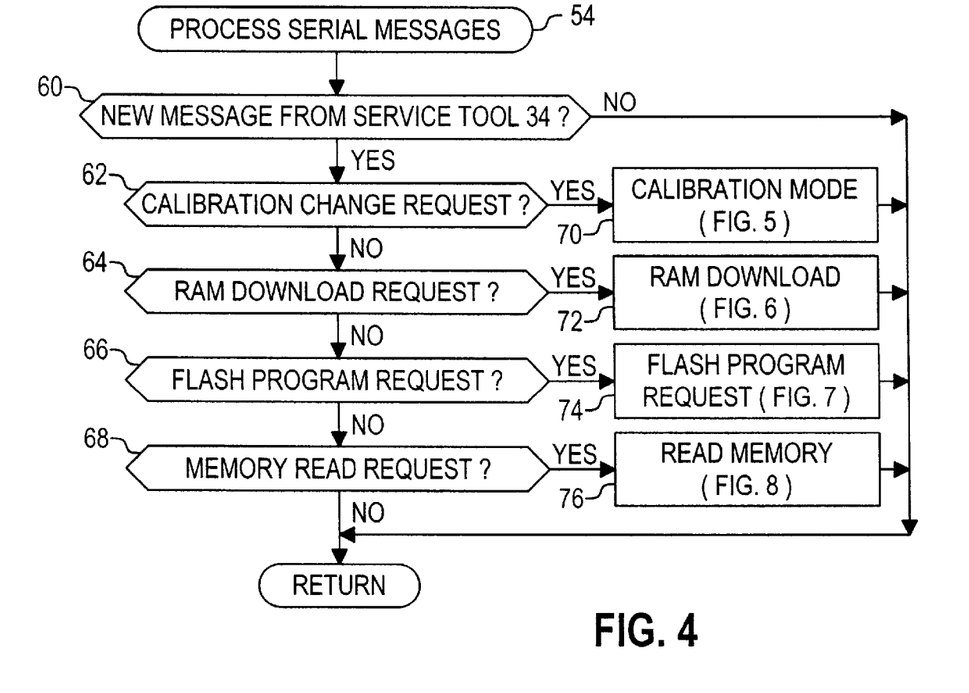
FIG. 4 details a portion of the flow diagram of FIG. 3 concerning the processing of messages received from the service tool of FIG. 1.
Figure 5:
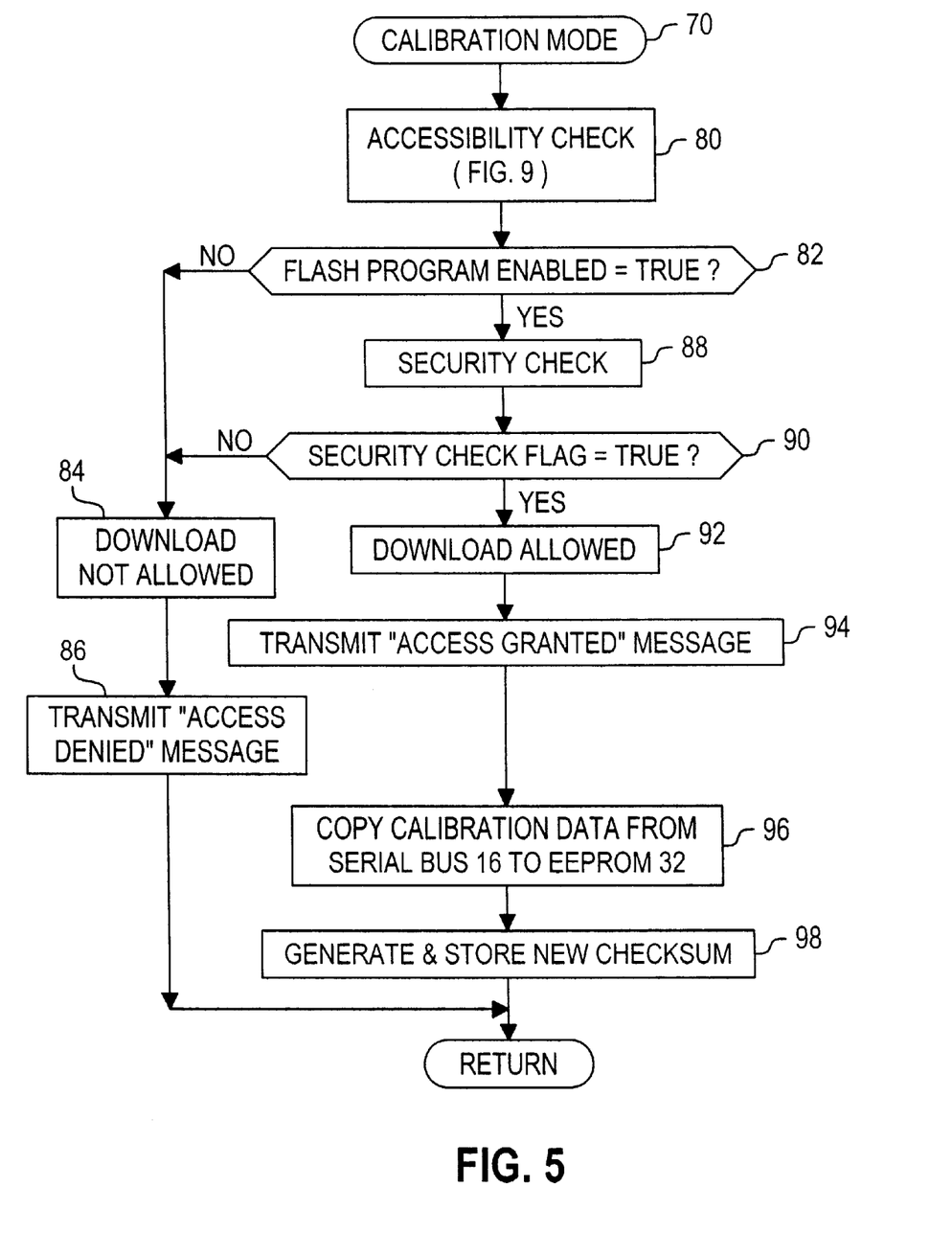
FIG. 5 details a portion of the flow diagram of FIG. 4 pertaining to calibration mode memory programming.
Figure 6:
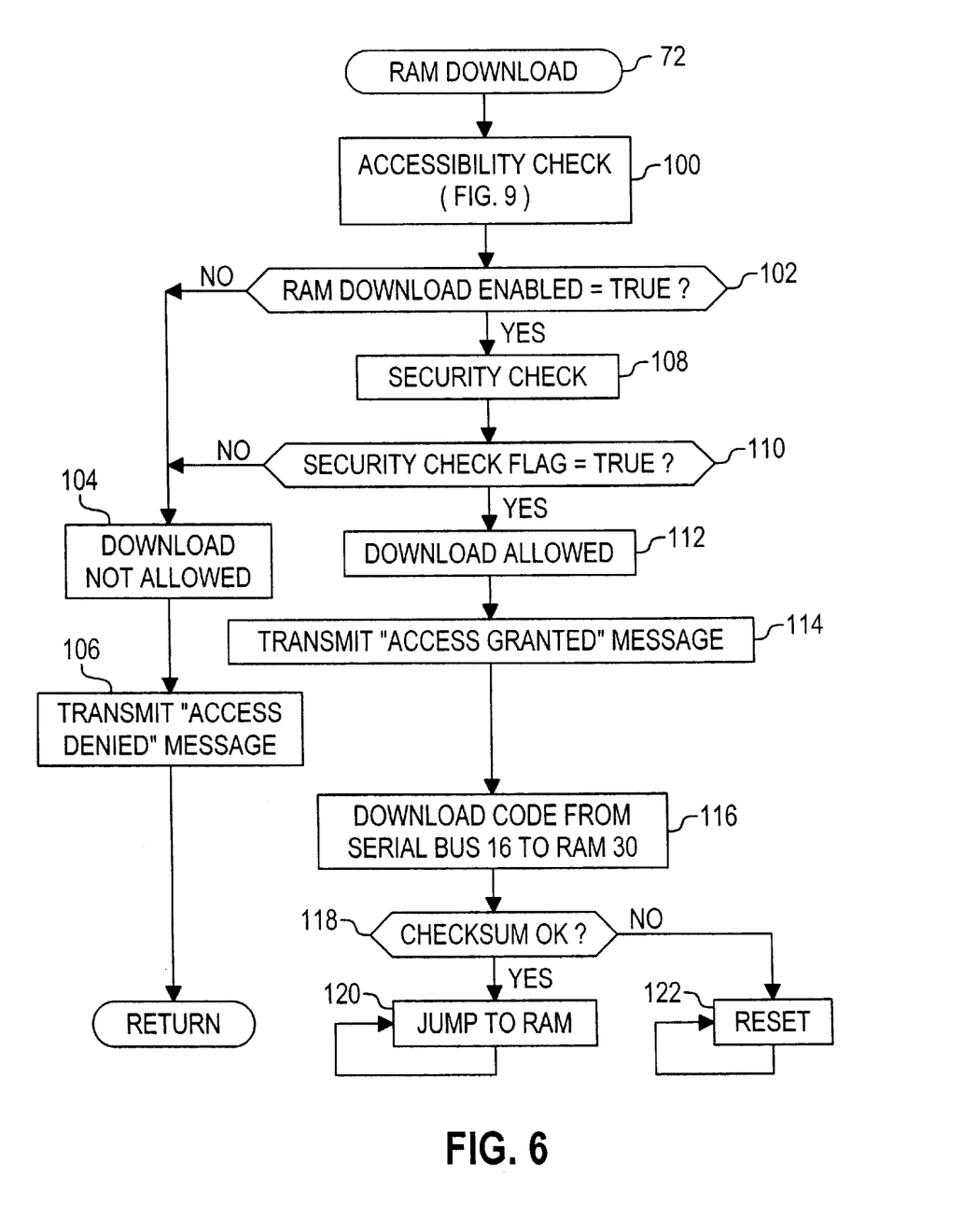
FIG. 6 details a portion of the flow diagram of FIG. 4 pertaining to downloading of executable routines to RAM during module manufacture.
Figure 7:
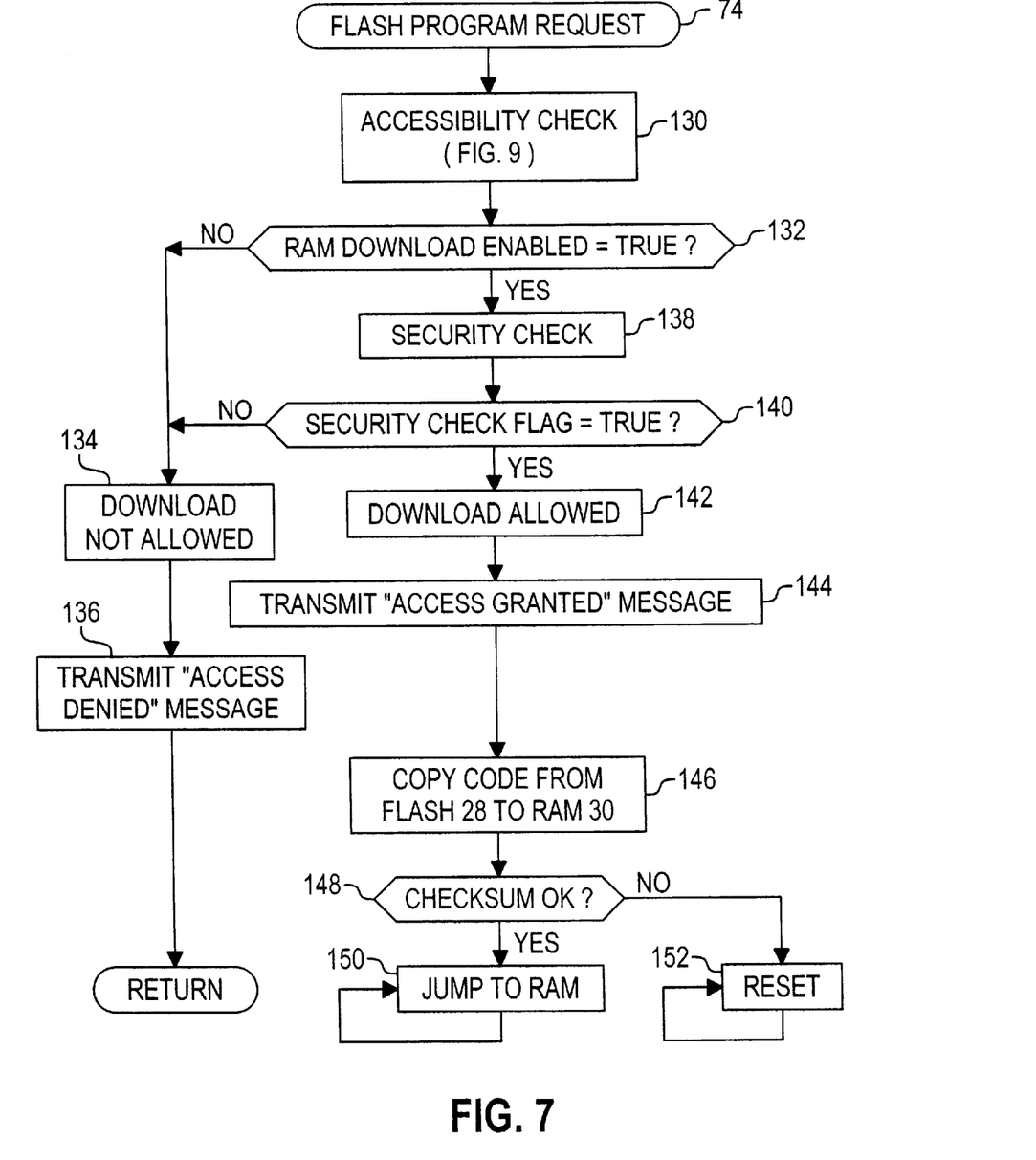
FIG. 7 details a portion of the flow diagram of FIG. 4 pertaining to flash memory programming.
Figure 8:
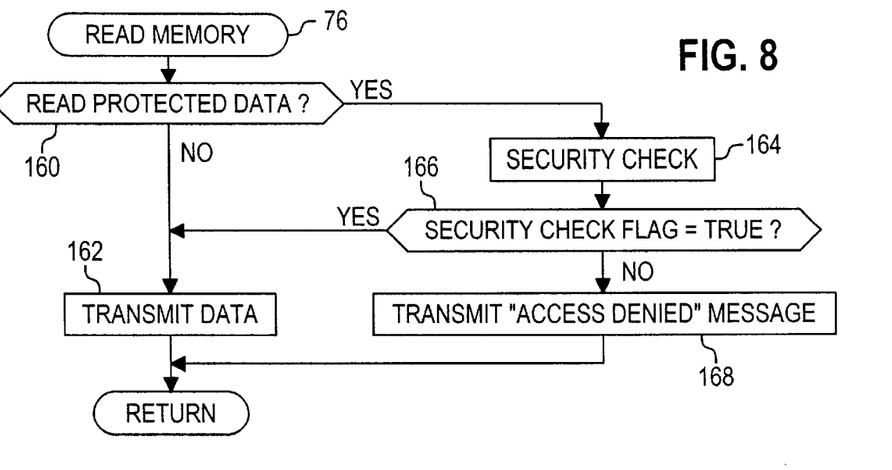
FIG. 8 details a portion of the flow diagram of FIG. 4 pertaining to a memory read request.

Referring to FIG. 4, the Process Messages block 54 of FIG. 3 first involves categorizing any messages received from service tool 34. When a new message is received, as detected at block 60, one or more of the decision blocks 62, 64, 66, 68 are executed to determine if the message is a calibration change request, a RAM download request, a flash programming request or a memory read request. If block 62 is answered in the affirmative, the calibration mode flow diagram of FIG. 5 is executed, as indicated at block 70; if block 64 is answered in the affirmative, the RAM download flow diagram of FIG. 6 is executed, as indicated at block 72; if block 66 is answered in the affirmative, the flash program flow diagram of FIG. 7 is executed, as indicated at block 74; and if block 68 is answered in the affirmative, the read memory flow diagram of FIG. 8 is executed, as indicated at block 76. If none of the decision blocks 62, 64, 66, 68 are answered in the affirmative, the Process Messages routine is exited.

Referring to FIG. 5, the Calibration Mode block 70 of FIG. 4 first involves executing block 80 to determine if the calibration data of EEPROM 32 is write-accessible. This determination, detailed in the flow diagram of FIG. 9, includes setting the status (i.e., TRUE or FALSE) of a CALIBRATION ENABLED flag, and block 82 of the calibration mode routine then checks the flag status. If the status of the CALIBRATION ENABLED flag is FALSE, the blocks 84 and 86 are executed to disable downloading of calibration data, and to transmit an "Access Denied" message to service tool 34. If the status of the CALIBRATION ENABLED flag is TRUE, the control module 12 executes block 88 to perform a security check for verifying that service tool 34 is authorized to make memory modifications; this can take the form of a "seed and key" authorization procedure in which the control module 12 sends a psuedo-random "seed" number to service tool 34, and the service tool 34 uses the received "seed" to compute a "key" number, which is transmitted to control module 12 for comparison with a corresponding "key" number independently computed by control module 12. The security check block 88 sets the status of a SECURITY CHECK flag, which is checked at block 90. If the SECURITY CHECK flag is FALSE, blocks 84 and 86 are executed as mentioned above to disable downloading of calibration data, and to transmit an "Access Denied" message to service tool 34. If the SECURITY CHECK flag is TRUE, the blocks 92–98 are executed to allow downloading of calibration data, to transmit an "Access Granted" message to service tool 34, to copy the calibration data from the serial bus 16 to the Calibration Area of EEPROM 32, and to generate and store a new checksum for the updated calibration area, completing the Process Messages routine.

The RAM Download routine designated by block 72 of FIG. 4 is similar to the above-described Calibration Mode routine. Referring to FIG. 6, the RAM Download routine first involves executing block 100 to determine if the RAM 30 is write-accessible. This determination, detailed in the flow diagram of FIG. 9, includes setting the status (i.e., TRUE or FALSE) of a RAM DOWNLOAD ENABLED flag. Then block 102 checks the flag status. If the status of the RAM DOWNLOAD ENABLED flag is FALSE, the blocks 104 and 106 are executed to disable downloading of data, and to transmit an "Access Denied" message to service tool 34. If the status of the CALIBRATION ENABLED flag is TRUE, the control module 12 executes block 108 to perform a security check for verifying the authenticity of service tool 34, as described above in reference to FIG. 5. Block 110 checks the status of the SECURITY CHECK. If it is FALSE, blocks 104 and 106 are executed as mentioned above to disable downloading of the data, and to transmit an "Access Denied" message to service tool 34; if it is TRUE, the blocks 112, 114, 116, 118, 120 and 122 are executed. Blocks 112, 114 and 116 allow downloading of an executable routine to RAM 30, transmit an "Access Granted" message to service tool 34, and download the executable code from the serial bus 16 to the User Area of RAM 30. Block 118 performs a checksum to see if the data was received correctly. If the checksum is invalid, block 122 executes a Reset to re-initialize the control module 12; if the checksum is valid, the block 120 executes a "Jump to RAM" instruction to set the program counter to initiate execution of the downloaded code.

The Flash Program routine designated by block 74 of FIG. 4 is similar to the above-described RAM Download routine. Referring to FIG. 7, the Flash Program routine first involves executing block 130 to determine if FPM 28 is write-accessible. This determination, detailed in the flow diagram of FIG. 9, includes setting the status (i.e., TRUE or FALSE) of a FLASH PROGRAM ENABLED flag. Then block 132 checks the flag status. If the status of the FLASH PROGRAM ENABLED flag is FALSE, the blocks 134 and 136 are executed to disable downloading of data, and to transmit an "Access Denied" message to service tool 34. If the status of the FLASH PROGRAM ENABLED flag is TRUE, the control module 12 executes block 138 to perform a security check for verifying the authenticity of service tool 34, as described above in reference to FIG. 5. Block 140 checks the status of the SECURITY CHECK. If it is FALSE, blocks 134 and 136 are executed as mentioned above to disable downloading of the data, and to transmit an "Access Denied" message to service tool 34; if it is TRUE, the blocks 142, 144, 146, 148, 150 and 152 are executed. Blocks 142, 144 and 146 allow downloading of data via serial bus 16, transmit an "Access Granted" message to service tool 34, and copy a Download and Execute routine from FPM 28 to the User Area of RAM 30. Block 148 performs a checksum to see if the data was transferred correctly. If the checksum is invalid, block 152 executes a Reset to re-initialize the control module 12; if the checksum is valid, the block 150 executes a "Jump to RAM" instruction to set the program counter to initiate execution of the Download and Execute routine for transferring the downloaded data to FPM 28.

The flow diagram of FIG. 8 details the Read Memory block 76 of FIG. 4. Block 160 determines if the read request concerns the protected data (status or event data) stored in EEPROM 32. If not, the block 162 is executed to transmit the requested data, completing the Process Messages routine. However, if the service tool 34 is requesting the protected data, the block 164 is executed to perform a security check for verifying the authenticity of service tool 34, as described above in reference to FIG. 5. Block 166 checks the status of the SECURITY CHECK. If it is TRUE, block 162 executed as mentioned above to transmit the requested data; if it is FALSE, block 168 is executed to transmit an "Access Denied" message to service tool 34.

Figure 9:
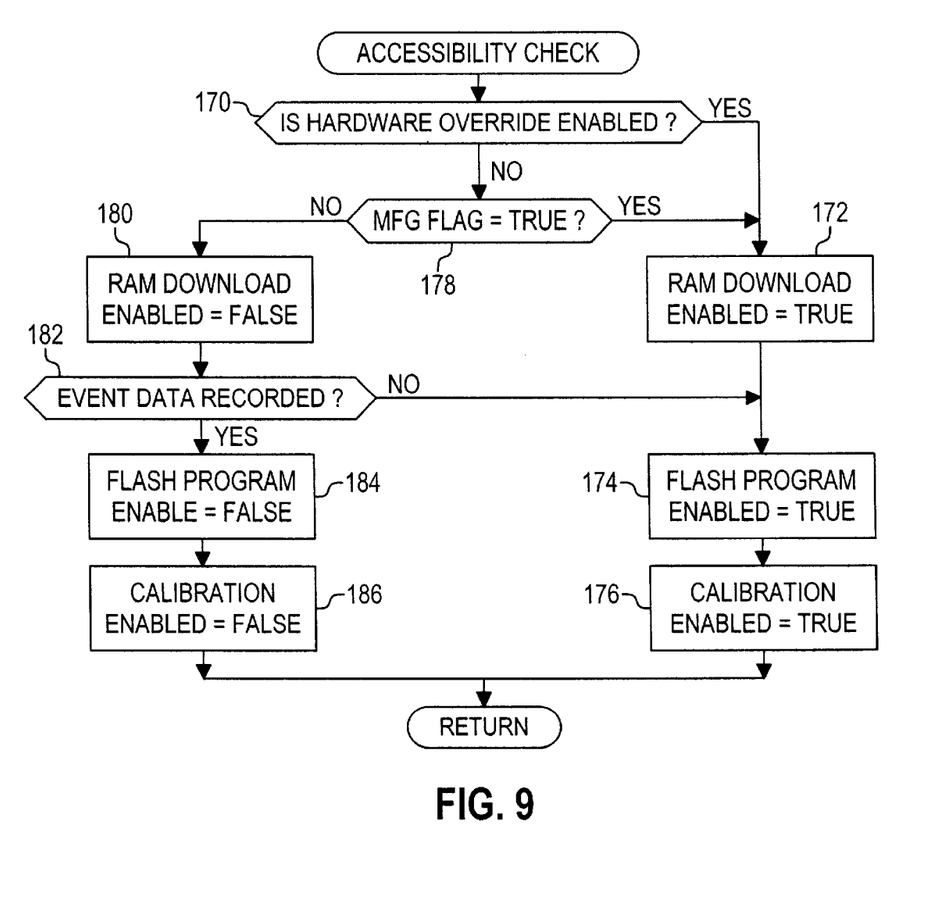
FIG. 9 details a portion of the flow diagrams of FIGS. 5, 6 and 7 pertaining to write access restriction.

The flow diagram of FIG. 9 details an Accessibility Check routine designated by the blocks 80, 100 and 130 of FIGS. 6, 7 and 8, respectively. Block 170 determines if the hardware override of control module 12 has been enabled. A hardware override only occurs if the module 12 is opened, and a predefined signal is applied to conductor terminal embedded in the module housing or circuit board. This necessarily involves physical alteration of the module 12, which can be visibly detected during analysis of a module retrieved from a vehicle. If the hardware override has been enabled, the blocks 172, 174 and 176 set the RAM DOWNLOAD, FLASH PROGRAM and CALIBRATION ENABLED flags to TRUE, completing the routine. If the hardware override has not been enabled, the block 178 checks the status of a MANUFACTURING FLAG, which forms part of the protected status data stored in EEPROM 32. If the flag status indicates that the module manufacture is not complete, the blocks 172, 174 and 176 are executed as mentioned above to set the RAM DOWNLOAD, FLASH PROGRAM and CALIBRATION ENABLED flags to TRUE. If the flag status indicates that the manufacturing has been completed, the blocks 180 and 182 are executed to set the RAM DOWNLOAD ENABLED flag to FALSE, and to determine if any data has been written to the Event Data area of EEPROM 32. Initially, the Event Data area is erased (or filled with a recognizable set of byte values), and the writing of event data (in the event of a detected crash event, for example) will alter the initialized data pattern. If block 182 determines that event data has not been written to the Event Data Area of EEPROM 32, the blocks 174 and 176 are executed as mentioned above to set the FLASH PROGRAM ENABLED and CALIBRATION ENABLED flags to TRUE. However, if event data has been stored in the Event Data area, the blocks 184 and 186 set the FLASH PROGRAM ENABLED and CALIBRATION ENABLED flags to FALSE.

In operation, then, the method of this invention protects the integrity of event data stored the programmable memory 32 of control module 12 while permitting authorized manufacturing and field alteration of the programmable memories 28, 32 with a Download and Execute routine resident in a designated sector of FPM 28. Download access to RAM 30 after module manufacture has been completed is denied, while during manufacture and field programming of the module prior to the writing of event data, the programmable memories 28, 32 may be externally altered with an authorized service tool 34. This involves transferring the Download and Execute routine from FPM 28 to RAM 30 for execution by the module's microprocessor, and downloading the new data or code over the series data bus 16 coupling the service tool 34 to the module 12. After event data has been written to EEPROM 32, external requests to alter FPM 28 are denied, and the transfer of the Download and Execute routine to RAM 30 is not permitted. While the method of this invention has been described in reference to the illustrated embodiment, it is expected that various modifications in addition to those mentioned above will occur to those skilled in the art. Accordingly, it will be understood that methods incorporating such modifications may fall within the scope of this invention, which is defined by the appended claims.

What is claimed is:

1. A method of operation for a microprocessor-based control module having a programmable memory for storing event data, where the method protects said event data from alteration by an external device while permitting authorized manufacturing and field alteration of data stored in the programmable memory with a Download and Execute routine, the method comprising the steps of:

storing the Download and Execute routine in a designated sector of said programmable memory during manufacture of said module; and after manufacture of said module has been completed, responding to a request by said external device to download data for storage in said programmable memory by:

determining if event data is stored in said programmable memory;

transferring said Download and Execute routine to a random access memory of said module and executing said Download and Execute routine for downloading data from said external device and storing the downloaded data in said programmable memory only if it is determined that event data is not stored in said programmable memory; and denying said request to download data if it is determined that event data is stored in said programmable memory.

2. The method of operation of claim 1, including the steps of:

granting requests by said external device to download data to said random access memory during manufacture of said module; and denying requests by said external device to download data to said random access memory after the manufacture of said module has been completed.

3. The method of operation of claim 1, including the steps of:

performing a security check to determine if said external device is authorized to access said module; and denying said request to download data if said external device fails to pass said security check.

4. A method of operation for a microprocessor-based control module having a programmable memory for storing event data, where the method protects said event data from alteration by an external device while permitting authorized manufacturing and field alteration of data stored in the programmable memory with a Download and Execute routine, the method comprising the steps of:

during manufacture of said module:

granting requests by said external device to download data, including a Download and Execute routine, to a random access memory of said module; and storing the Download and Execute routine in a designated sector of said programmable memory; and after the manufacture of said module has been completed:

denying requests by said external device to download data to said random access memory;

determining if event data is stored in said programmable memory;

granting a request by said external device to download data for storage in said programmable memory using the Download and Execute routine stored in said programmable memory only if it is determined that event data is not stored in said programmable memory; and denying a request by said external device to download data for storage in said programmable memory if it is determined that event data is stored in said programmable memory.

5. The method of operation of claim 4, wherein the step of granting a request by said external device to download data for storage in said programmable memory includes the steps of:

copying said Download and Execute routine from said designated sector of said programmable memory to the random access memory of said module; and executing the copied Download and Execute routine for downloading data from said external device and storing the downloaded data in said programmable memory.

6. The method of operation of claim 4, including the steps of:

performing a security check to determine if said external device is authorized to access said module; and denying said request to download data if said external device fails to pass said security check.

* * * * *